United States Patent [19]

Simon

[11] 4,002,286
[45] Jan. 11, 1977

[54] METHOD OF MANUFACTURING A STEERING KNUCKLE AND SPINDLE

[76] Inventor: Joseph A. Simon, 17755 Masonic Blvd., Fraser, Mich. 48026

[22] Filed: Nov. 3, 1975

[21] Appl. No.: 628,356

[52] U.S. Cl. .................. 228/174; 228/114
[51] Int. Cl.² ........................... B23K 31/00
[58] Field of Search ................ 228/112–114, 228/170–174; 74/496, 499

[56] References Cited

UNITED STATES PATENTS

| | | | |
|---|---|---|---|
| 2,226,038 | 12/1940 | Westcott et al. | 74/499 |
| 3,487,714 | 1/1970 | Goodacre | 74/496 |
| 3,831,245 | 8/1974 | Amos | 228/112 X |

Primary Examiner—Harold D. Whitehead
Attorney, Agent, or Firm—Cullen, Settle, Sloman & Cantor

[57] ABSTRACT

An improved method for manufacturing a steering knuckle and spindle unit for a heavy duty vehicle, such as a truck, including forming the spindle, separately forming the knuckle, and finally welding the knuckle and spindle together to form an integral unit. The spindle is a hollow elongated metal tube preferably cold formed. The knuckle is formed by forging and a bore is machined or pierced in the knuckle to be aligned with the hollow portion of the spindle. The knuckle and spindle are then welded together such as by spin or inertia or electron beam welding to form an integral unit.

10 Claims, 8 Drawing Figures

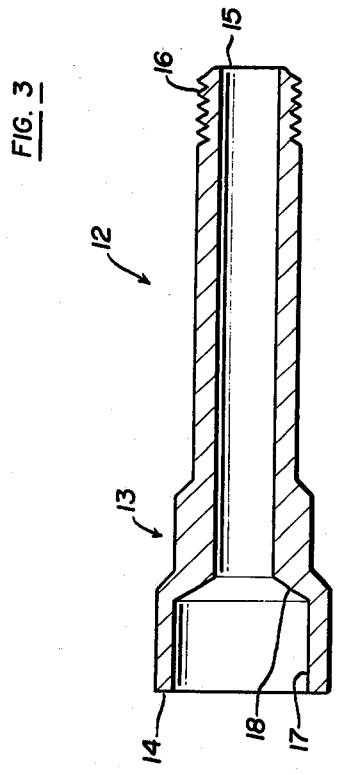
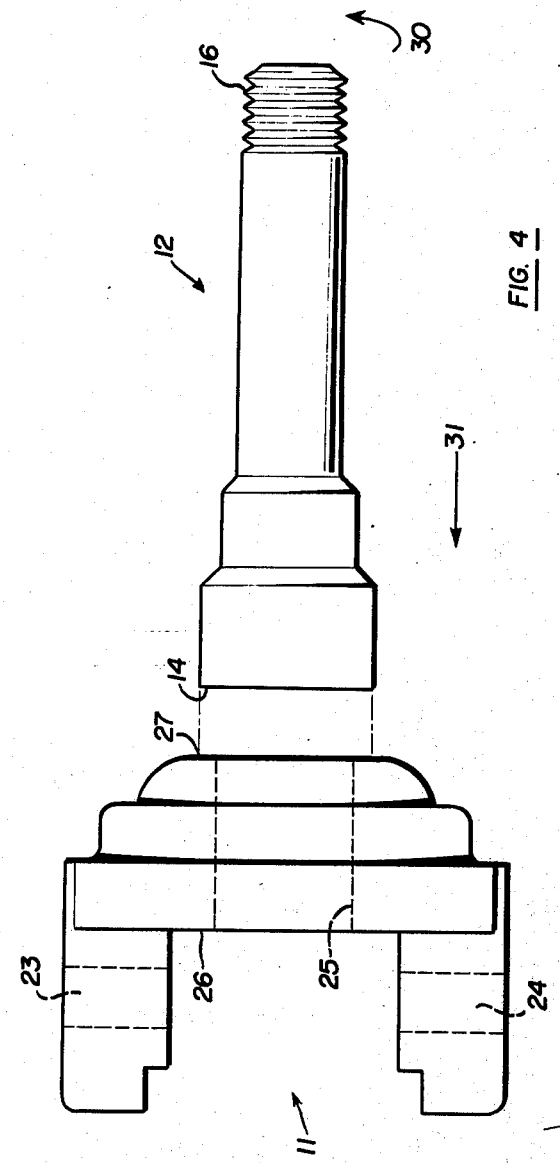
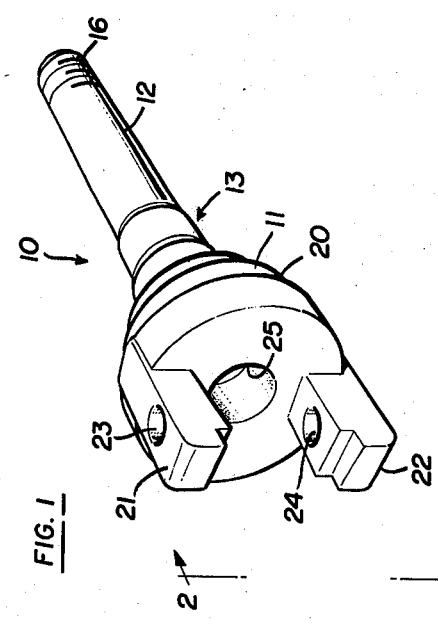
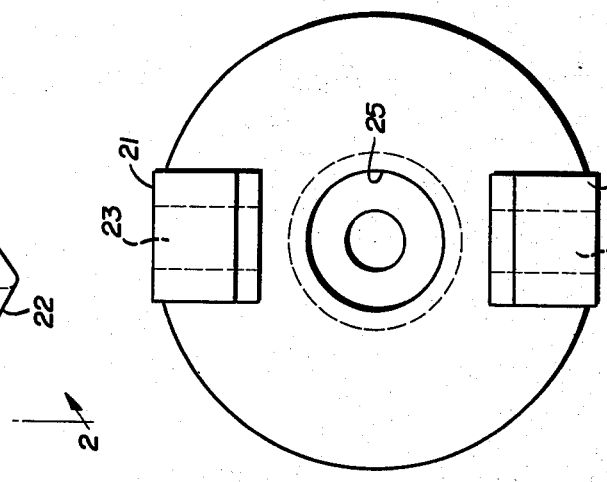

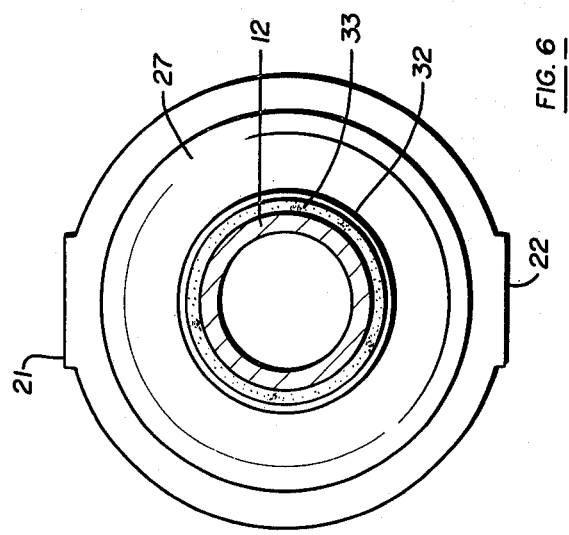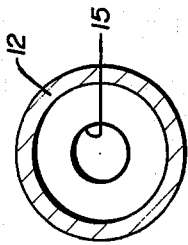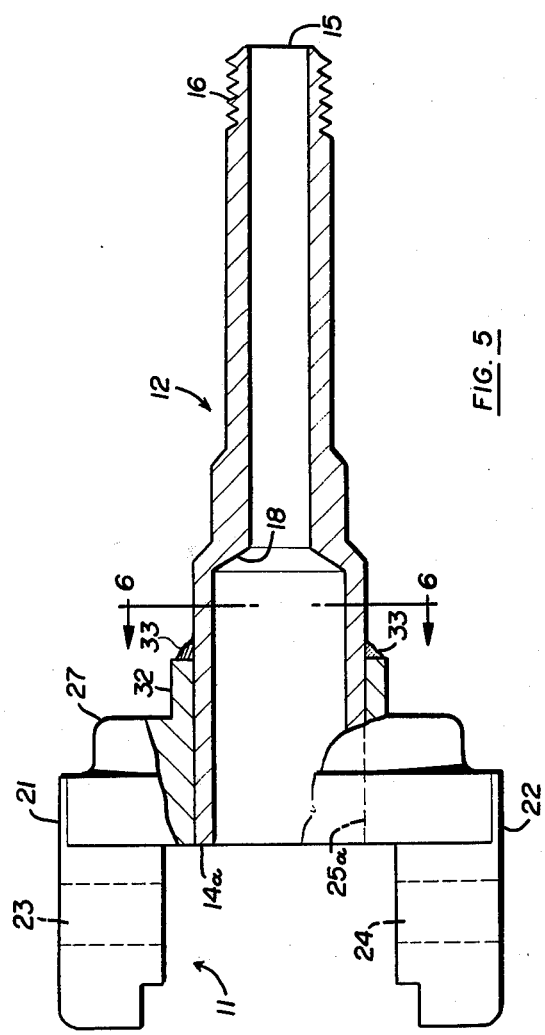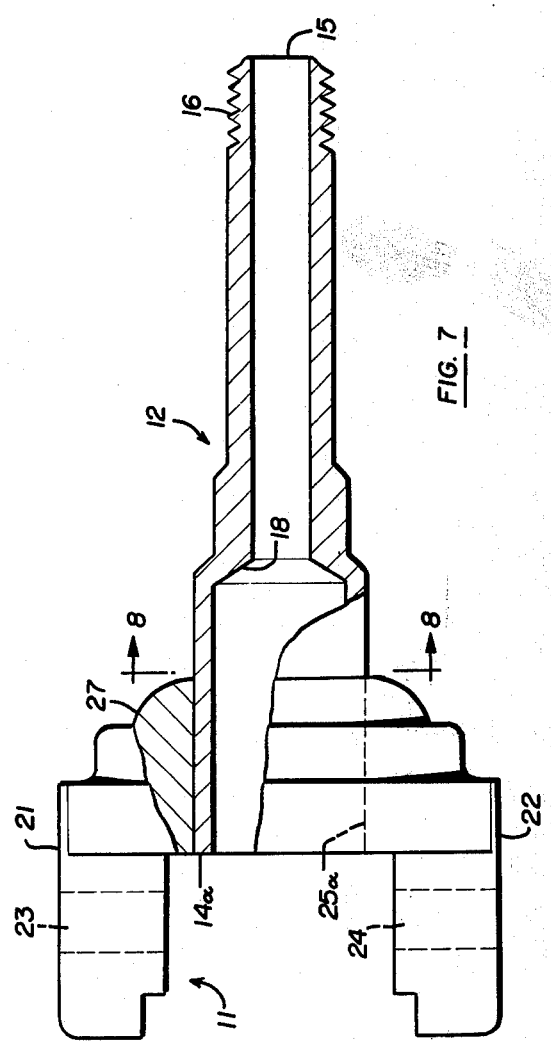

METHOD OF MANUFACTURING A STEERING KNUCKLE AND SPINDLE

BACKGROUND OF THE INVENTION

The invention herein relates to the forming of a knuckle and spindle unit by separately forming a tubular elongated spindle, forging a steering knuckle and thereafter, welding the spindle and knuckle together to form an integral unit.

In the past, steering knuckle and spindle units for automotive steering assemblies have been made by a one-piece forging or casting. Since the forging or casting is not dimensionally accurate, considerable machining for accurate sizing was necessary. Thereafter, various additional machining steps were performed to provide appropriate bores and recesses in the knuckle to receive the king pin and the brake parts.

Hence, the invention herein relates to a simplified process for forming an integral steering knuckle aand spindle unit by separately forming each part and then joining them by welding. Separately forming the spindle permits the spindle to be cold formed as a hollow tube substantially of the desired size and stronger than a forged spindle. Also, the use of a hollow spindle provides a conduit to receive the wires for non-skid disc brakes, front wheel drive, and for better cooling. Forging the knuckle as a separate part provides greater flexibility in the selection of forging techniques and also provides a smaller part for the machining and boring operations. Thus, the present invention provides an integral steering knuckle-spindle unit which is considerably less costly, quicker and more accurate to produce.

SUMMARY OF INVENTION

The invention herein contemplates cold forming a tubular spindle and independently forming, such as by forging, a knuckle. Thereafter. the knuckle is machined to provide bores to receive a king pin and also to align with the hollow center of the spindle. Thereafter, the spindle and knuckle are welded together to form an integral unit. Spin or inertia welding techniques are preferred, i.e., relative rotating and advancing of the spindle and knuckle toward each other, although electron beam welding may be used.

In friction welding, one part, such as the spindle, is rotated while in frictional contact with the knuckle until the area of contact becomes very hot. The rotational force is removed and then the knuckle and spindle are pressed together as in butt welding.

In inertia welding the spindle is rotated at a higher speed than in friction welding. The knuckle and spindle are pressed together and they fuse or weld. The welding overcomes the inertia of the spindle and stops the rotation of the spindle.

DESCRIPTION OF THE DRAWINGS

The various objects and advantages of the present invention will become apparent upon reading the following detailed description taken in conjunction with the drawings.

In the drawings, wherein like reference numerals identify corresponding parts:

FIG. 1 is a perspective illustration of the completed integral steering knuckle and spindle unit;

FIG. 2 is a side elevation of the knuckle as seen in the plane of arrows 2—2 of FIG. 1;

FIG. 3 is a cross sectional front elevation view of the spindle of the present invention;

FIG. 4 is an exploded representation of the rotating and advancing of the spindle and knuckle relative to each other for welding the parts together;

FIG. 5 is a fragmentary side elevation, partly in cross section, illustrating a technique for welding the knuckle and spindle together by seam welding;

FIG. 6 is a cross sectional elevation as seen in the plane of arrows 6—6 of FIG. 5;

FIG. 7 is a fragmentary side elevation, partly in cross section, illustrating another technique of welding the knuckle and spindle together by electron beam welding; and FIG. 8 is a cross sectional elevation as seen in the plane of arrows 8—8 of FIG. 7.

DETAILED DESCRIPTION OF THE INVENTION

As shown in the drawings, an integral steering knuckle and spindle unit 10, commonly just referred to as the steering knuckle, includes the knuckle portion 11 and a spindle portion 12. The spindle is an elongated metal tube of circular cross section being tapered as at 13 from a first end 14 of greater diameter to a second end 15 of smaller diameter. The second end 15 may have external threads 16 onto which a wheel unit is attached. The bore 17 of the spindle may be larger at the first end 14 and may be similarly tapered as at 18 to a smaller diameter bore at the second end 15 of the spindle.

In a preferred embodiment, the spindle may be formed by a cold forming process such as that disclosed in U.S. Pat. No. 3,739,620 of June 19, 1973 of which I am a joint inventor and entitled Process for Forming a Flared End Tubular Metal Part.

More specifically, the spindle portion 12 is cold formed from a suitable hollow seamless blank. The blank is placed within a die having an upper flared end and a narrow middle portion forming a shoulder therebetween and with a straight cylindrically shaped lower portion of smaller diameter than the middle portion and upper end. A punch and ram are used to force the blank along the die, like an extrusion process, to partially form the spindle in the die. Thereafter, the partially formed blank is placed in a second die and a differently configured punch corresponding to the enlarged bore 17 at the first end 14 of the spindle and having a tapered part to form the tapered internal portion 18 of the spindle is used. Again, the punch is forced into the partially formed blank to form the enlarged, flared first end 14.

The knuckle 11, as illustrated in greater detail in FIGS 1, 2 and 4, includes a base portion 20 and upper and lower boss portions 21, 22 respectively. The knuckle 11 may be formed by a conventional hot forging process. After the forging of the knuckle portion 11 is completed, a hole 23 is bored in boss 21 and a hole 24 is bored in boss 22. These two holes are vertically aligned as illustrated in FIGS. 1 and 2 to receive the conventional king pin. A horizontal hole 25 is bored in the base 20 of the knuckle and extends from the front face 26 to the rear face 27 of the base 20. This hole is positioned to be aligned with the bore 17 of the spindle.

At this point, it may be appreciated that if the knuckle and spindle portions were initially formed as a complete forging or casting, it would be necessary to bore along the entire length of the spindle in order to provide the desired configuration of a hollow spindle.

Similarly, it may be appreciated that since the thickness of the base 20 of the knuckle portion 11 from the front face 26 to the rear face 27 is so much less than the length of the spindle, there is a vast saving of time according to the principles of the present invention. Furthermore, the particular cutting tool utilized for boring may, of course, be employed on a greater number of knuckle units, since it is not necessary to bore along the length of the spindle. Thus, making the units separately saves the time and expense of machining the hollow spindle. Furthermore, a hollow cold formed spindle is stronger and provides for better cooling than a solid forged spindle. Finally the hollow spindle provides a convenient conduit for the wires of non-slip or non-skid brakes.

FIG. 4 illustrates, schematically, the joining together of the spindle portion 12 and the knuckle portion 11. In a preferred embodiment, the knuckle portion 11 is maintained stationary and the spindle is placed in a lathe and rotated relative to its longitudinal axis such as illustrated by the arrow 30. Simultaneously with the rotation, the spindle is advanced as illustrated by arrow 31 until the first end 14 of the spindle portion comes into contact with the rear face 27 of the knuckle portion and the two portions are welded together by either friction or inertia welding.

In addition to friction and inertia welding seam or electron beam welding may be utilized with slight modification of the knuckle and spindle. FIGS. 5 and 6 illustrate a first technique of seam welding. Specifically, for the embodiment of FIGS. 5 and 6, the base 20 of the knuckle is provided with a flange 32 which extends rearwardly from the rear face 27. Also, the bore 25a of the knuckle 11 has been increased in diameter relative to the bore 25 of the knuckle of FIGS. 1, 2 and 4 so that the knuckle bore frictionally retains the spindle, i.e., a press fit. In addition the large end 14a of the spindle 12 has been lengthened axially as compared to the large end of the spindle of FIGS. 1, 3 and 4.

The flared or larger end 14a of the spindle is press fit into the bore 25a of the knuckle and the parts seam welded together around the circumference of the flared end 14a of the spindle to weld the spindle to the knuckle flange 32 as at weld 33.

As exemplified in FIGS. 7 and 8, the flange 32 is omitted and an electron beam weld formed between the enlarged bore 25a of the knuckle and around the circumference of the spindle. This is accomplished with the larger bore knuckle and longer spindle force fit therein as in FIGS. 5 and 6. The force fit may be obtained by first heating the knuckle to expand it, inserting the spindle in the knuckle, and cooling the knuckle to contract around the spindle, as is conventional.

The foregoing is a complete description of the preferred embodiment of the invention. Various changes and modifications may be made without departing from the spirit and scope of the present invention. For example, any suitable welding technique may be employed. The invention, therefore, should be limited only by the scope of the following claims.

What is claimed is:

1. An improved method for manufacturing an integral steering knuckle and spindle unit for a vehicle such as a truck comprising:
    cold forming a hollow elongated metal spindle portion having first and second ends;
    forging a knuckle portion having a base and two spaced apart bosses on opposite ends of said base;
    machining an aligned bore in each boss to receive a king pin;
    machining a bore through the base of said knuckle portion to be aligned with the hollow portion of said spindle; and
    welding said knuckle portion base and spindle portion first end together to form an integral unit with the bore of said knuckle base aligned with the hollow portion of said spindle.

2. The invention as defined in claim 1, wherein said knuckle portion and said spindle portion are welded together by spin welding.

3. The invention as defined in claim 1, wherein said spindle portion and said knuckle portion are welded together by friction welding.

4. The invention as defined in claim 1, wherein said spindle portion and said knuckle portion are welded together by inertia welding.

5. The invention as defined in claim 1, wherein said cold formed hollow spindle first end has greater inside and outside diameters than said hollow spindle second end.

6. The invention as defined in claim 1, wherein said spindle is cold formed by the steps of cold forming a blank into an elongated hollow spindle having an outside diameter at said first end larger than said second end, and thereafter cold forming said first end to enlarge the inside diameter relative to the inside diameter at said second end.

7. The invention as defined in claim 1, wherein said spindle portion and said knuckle portion are welded together by electron beam welding.

8. The invention as defined in claim 1, wherein the bore in the base of said knuckle portion is machined to a size to frictionally receive said first spindle end, and including inserting said first spindle end into said bore in the base of the knuckle, and electron beam welding the knuckle portion and spindle portion together.

9. The invention as defined in claim 1, wherein said knuckle base has a rearwardly projecting circular flange, said first spindle end is inserted into the flange and the bore in said knuckle base, and said knuckle and spindle are welded together circumferentially exteriorly of said spindle along the edge of said flange.

10. The invention as defined in claim 1, wherein said first spindle end is inserted into the bore in said knuckle base, and said knuckle and spindle are welded together circumferentially exteriorly of said spindle along the bore in said knuckle.

* * * * *